United States Patent
Hikazudani et al.

(10) Patent No.: US 7,825,060 B2
(45) Date of Patent: Nov. 2, 2010

(54) METHOD FOR PRODUCTION OF CATALYST AND CATALYST PRODUCED BY THE METHOD

(75) Inventors: Susumu Hikazudani, Osaka (JP); Kazuhiro Yano, Osaka (JP); Takehiro Shimizu, Osaka (JP); Hidetake Okamoto, Osaka (JP); Masaki Akiyama, Osaka (JP)

(73) Assignee: Hitachi Zosen Corporation, Osaka-shi (JP)

(*) Notice: Subject to any disclaimer, the term of this patent is extended or adjusted under 35 U.S.C. 154(b) by 0 days.

(21) Appl. No.: 12/441,917

(22) PCT Filed: Sep. 18, 2007

(86) PCT No.: PCT/JP2007/068061
§ 371 (c)(1), (2), (4) Date: Mar. 19, 2009

(87) PCT Pub. No.: WO2008/035663
PCT Pub. Date: Mar. 27, 2008

(65) Prior Publication Data
US 2010/0041547 A1     Feb. 18, 2010

(30) Foreign Application Priority Data
Sep. 21, 2006  (JP) .............................. 2006-255914

(51) Int. Cl.
*B01J 27/24*   (2006.01)

(52) U.S. Cl. ....................................................... 502/200
(58) Field of Classification Search .................... None
See application file for complete search history.

(56) References Cited

U.S. PATENT DOCUMENTS 5,565,091 A * 10/1996 Iino et al. ............... 208/216 R
5,618,505 A *  4/1997 Subramanian et al. ... 423/213.2

FOREIGN PATENT DOCUMENTS

| JP | 53 90184    | 8/1978 |
| JP | 54 69587    | 6/1979 |
| JP | 11 57489    | 3/1999 |
| JP | 2001 170491 | 6/2001 |

* cited by examiner

*Primary Examiner*—Melvin C Mayes
*Assistant Examiner*—Stefanie Cohen
(74) *Attorney, Agent, or Firm*—Oblon, Spivak, McClelland, Maier & Neustadt, L.L.P.

(57) ABSTRACT

A method for producing a catalyst of the present invention is characterized by sequentially performing the steps of: (i) dipping an end face portion of a carrier structure having a catalytic component carried thereon in an aqueous metal salt solution at a concentration of 2.7 to 3.88 mol/L in terms of mole of the metal; (ii) drying the dipped end face portion; (iii) dipping the dried end face portion again in an aqueous metal salt solution whose metal species is the same as that in the aqueous metal salt solution at a concentration of 2.7 to 3.88 mol/L in terms of mole of the metal; and (iv) performing a calcination treatment to harden the catalytic end face.

12 Claims, No Drawings

METHOD FOR PRODUCTION OF CATALYST AND CATALYST PRODUCED BY THE METHOD

TECHNICAL FIELD

The present invention relates to a method for producing a catalyst for denitration or the like of an exhaust gas containing a high content of dust such as an exhaust gas from a coal-fired boiler for power generation or an exhaust gas from an incinerator, and a catalyst produced by the method.

BACKGROUND ART

Harmful compounds such as nitrogen compounds known as NOx contained in an exhaust gas discharged from a coal-fired boiler for power generation or an incinerator are conventionally decomposed with a metal oxide having a denitration catalytic activity such as $TiO_2$ or the like. As a catalyst carrying such a catalytic component, a catalyst having a catalytic component such as $TiO_2$ carried on a surface of a carrier structure with a plate-like structure, a honeycomb-like structure, etc. has been used.

However, in the above-mentioned exhaust gas, other than harmful compounds such as nitrogen compounds, a large amount of dust is contained. When such a large amount of dust comes into contact with a catalytic surface, the catalytic component carried on the catalytic surface is abraded, and therefore, the catalytic component on the surface is decreased over time. Due to this, it was difficult to apply such a catalyst for a long time. This problem is evident on a catalytic end face where the collision frequency between dust in the exhaust gas and the catalyst is high.

Studies in which the amount of the catalytic component carried on the catalytic surface is increased and the like were performed to cope with the decrease in the catalytic component, however, a significant effect was not observed. Therefore, the development of an excellent catalyst in abrasion resistance in which the catalytic component carried on the catalytic surface is not decreased even if an exhaust gas containing a large amount of dust is brought into contact with the surface has been demanded. As one of such catalysts, a catalyst whose catalytic end face having a high collision frequency with dust has been strengthened by coating is described in Patent document 1.

However, although the above method of strengthening the catalytic end face is effective in the case where the density of the catalytic component on the catalytic surface is equal to or higher than a given value, when this density is lower than the given value, a decrease in the catalytic component on the end face due to abrasion is observed. This reason is that voids between catalytic component particles are increased when the density of the catalytic component is decreased, and therefore, even if an aqueous metal salt solution as an end face hardening agent is introduced, the increased voids cannot be filled. Further, even if the catalyst is dipped in an aqueous metal salt solution as an end face hardening treatment and thereafter the catalyst is dipped in the aqueous metal salt solution again without performing a drying step, the voids in the catalyst are filled with the aqueous solution in the first dipping, and therefore, the voids in the catalyst are not further filled with the aqueous metal salt solution in the second dipping. Accordingly, the abrasion strength of an end face cannot be improved by this method.

Patent document 1: JP-A-2001-170491

DISCLOSURE OF THE INVENTION

Problems that the Invention is to Solve

The present invention has been made in view of the above circumstances and has an object to provide a method for producing a catalyst which is not abraded by dust in an exhaust gas regardless of the density of a catalytic component on a catalytic surface even when the exhaust gas containing a large amount of dust is treated, and a catalyst produced by the method.

Means for Solving the Problems

The method for producing a catalyst of the present invention is characterized by sequentially performing the steps of:

(i) dipping an end face portion of a carrier structure having a catalytic component carried thereon in an aqueous metal salt solution at a concentration of 2.7 to 3.88 mol/L in terms of mole of the metal;

(ii) drying the dipped end face portion;

(iii) dipping the dried end face portion again in an aqueous metal salt solution whose metal species is the same as that in the aqueous metal salt solution at a concentration of 2.7 to 3.88 mol/L in terms of mole of the metal; and (iv) performing a calcination treatment to harden the catalytic end face.

Examples of the aqueous metal salt solution for improving a property of abrasion resistance of the catalyst include an aqueous ammonium metatungstate solution and an aqueous ammonium metavanadate solution. When the concentration of the aqueous metal salt solution represented by a mole of the metal per unit volume is less than 2.7 mol/L, a required abrasion strength cannot be obtained, therefore, the concentration thereof should be at least 2.7 mol/L. The upper limit of the concentration of the aqueous metal salt solution is not particularly limited for improving the abrasion strength of the catalyst, however, 3.88 mol/L is appropriate as the upper limit from the economical viewpoint.

The drying of the structure performed after dipping it in the aqueous metal salt solution may be performed by any method, however, it is preferably performed by blowing heated air (for example, at 40 to 150° C.) on the catalytic surface.

The catalytic component in the method of the present invention may be, for example, titania, vanadium oxide, tungsten oxide or the like, which has a selective catalytic reduction activity for NOx in an exhaust gas.

The structure may have any form such as a plate-like structure or a honeycomb-like structure, however, it preferably has a honeycomb-like structure. The structure having a honeycomb-like structure may be produced by any method, and for example, it is produced by alternately bonding plural corrugated ceramic fiber sheets and plural flat ceramic fiber sheets.

Further, the present invention is directed to a catalyst produced by any of the above-mentioned methods, i.e., a catalyst entire of which has been strengthened for abrasion resistance or a catalyst produced by performing any of the above-mentioned methods with respect to an end face of the structure, i.e., a catalyst having a strengthened end face where dust most frequently collides in the actual use. In particular, the catalyst of the present invention can achieve excellent abrasion resistance even if the amount of carried catalytic component is small.

ADVANTAGE OF THE INVENTION

In the method for producing a catalyst of the present invention, after first dipping in an aqueous metal salt solution is performed, drying was performed, and thereafter second dipping in an aqueous metal salt solution is performed. In this manner, a catalyst which is prevented from being abraded by dust even if it is used for an exhaust gas containing a large amount of dust can be produced.

BEST MODE FOR CARRYING OUT THE INVENTION

Hereinafter, the present invention will be specifically described with reference to Examples, however, the scope of the invention is not limited to the following Examples.

Example 1

(1) A honeycomb structure subjected to a treatment of immersing in silica sol and drying was immersed in titania sol in which titania fine particles were uniformly dispersed for 0.5 hour. Then, the structure was taken out of the sol and dried in an air atmosphere at 170° C. for 40 minutes, followed by calcinating in an air atmosphere at 500° C. for 3 hours. By this procedure, titania as a catalytic component was carried on the structure. The amount of titania carried on the structure was separately measured and found to be 70 g/m$^2$.

(2) The structure having titania carried thereon was immersed in silica sol for 0.5 hour. Then, the structure was taken out of the sol and calcined in an air atmosphere at 500° C. for 40 minutes. By this procedure, silica was carried on the structure.

(3) The structure having silica carried thereon was immersed in a 2.75 g/l aqueous ammonium metavanadate solution for 0.5 hour. Then, the structure was taken out of the aqueous solution and dried in an air atmosphere at 220° C. for 2 hours.

(4) An end face portion (10 mm deep) of the structure having vanadium carried thereon was dipped in a 3.88 mol/L aqueous ammonium metatungstate solution for 5 seconds.

(5) The structure was taken out of the aqueous ammonium metatungstate solution and dried in an air atmosphere at 220° C. for 2 hours in an electric furnace.

(6) The structure after drying was dipped again under the same conditions as in the above (4) and dried under the same conditions as in the above (5).

(7) After drying, the structure was calcined in an air atmosphere at 400° C. for 30 minutes to perform a hardening treatment of the catalytic end face.

Example 2

A catalyst was produced in the same manner as in Example 1 except that drying was performed by blowing heated air (40° C.) on the end face of the structure instead of using the electric furnace in Example 1.

Example 3

A catalyst was produced in the same manner as in Example 2 except that the concentration of the aqueous ammonium metatungstate solution was set to 3.49 mol/L.

Example 4

A catalyst was produced in the same manner as in Example 2 except that the concentration of the aqueous ammonium metatungstate solution was set to 3.10 mol/L.

Example 5

A catalyst was produced in the same manner as in Example 2 except that the concentration of the aqueous ammonium metatungstate solution was set to 2.72 mol/L.

Comparative Example 1

Example in which the Concentration of the Aqueous Metal Salt Solution does not Satisfy the Predetermined Level A catalyst was produced in the same manner as in Example 2 except that the concentration of the aqueous ammonium metatungstate solution was set to 1.94 mol/L.

Comparative Example 2

Example in which the Second Dipping in Metal Salt is not Performed

After performing the procedures (1) to (5) in Example 1, the procedure (7) was performed without performing the procedure (6), whereby a catalyst was produced.

Comparative Example 3

Example in which the Drying Step is not Performed after the First Dipping in Metal Salt After performing the procedures (1) to (4) in Example 1, the structure was taken out of the aqueous metal salt solution and left as such overnight at room temperature. Then, the procedures (6) and (7) in Example 1 were performed, whereby a catalyst was produced.

An experiment was performed by placing each of the catalysts produced in Examples 1 to 5 and Comparative examples 1 to 3 in a dust-containing exhaust gas treatment device and comparing the respective catalysts for depth of abrasion due to dust.

The exposure time to the dust-containing gas was set to a time corresponding to 2000 hours in the case of using in an actual exhaust gas treatment device. The content of dust in the used dust-containing gas was 0.7 g/L. Further, the temperature in the exhaust gas treatment device during the experimental procedure was set to room temperature, and the flow rate of the exhaust gas was set to 25 L/min.

The obtained results are shown in the following Table 1.

TABLE 1

|  | Depth of abrasion of end face (mm) |
|---|---|
| Example 1 | almost 0 mm |
| Example 2 | almost 0 mm |
| Example 3 | almost 0 mm |
| Example 4 | 0.5 mm or less |
| Example 5 | about 1 mm |
| Comparative example 1 | 1 mm or more |
| Comparative example 2 | 1 mm or more |
| Comparative example 3 | 1 mm or more |

As shown in Table 1, in the catalysts of Examples 1 to 5 according to the present invention, abrasion due to dust on the surface of the catalytic end face was almost not observed or observed to a depth of at most about 1 mm. In Comparative example 1 in which the concentration of the aqueous ammonium metatungstate solution was set to 1.94 mol/L, abrasion was observed to a depth of 1 mm or more. Also in Comparative examples 2 and 3, abrasion was observed to a depth of 1 mm or more. From these results, it could be confirmed that a catalyst having improved abrasion strength can be obtained by the method of the present invention. Further, it could also be confirmed that the concentration of the dipping liquid should be 2.7 mol/L or more.

The invention claimed is:

1. A method for producing a catalyst, comprising sequentially performing:
   (i) dipping an end face portion of a carrier structure having a catalytic component carried thereon in an aqueous ammonium metatungstate solution at a concentration of 2.7 to 3.88 mol/L in terms of moles of tungsten;
   (ii) drying the dipped end face portion;
   (iii) dipping the dried end face portion again in an aqueous ammonium metatungstate solution at a concentration of 2.7 to 3.88 mol/L in terms of moles of tungsten; and
   (iv) performing a calcination treatment to harden the catalytic end face.

2. The method according to claim 1, wherein a surface of the carrier structure obtained by the method has a depth of abrasion of 0.5 mm or less.

3. The method according to claim 1, wherein the catalytic component comprises titania, vanadium oxide, or tungsten oxide.

4. The method according to claim 1, wherein the catalytic component is titania.

5. The method according to claim 1, wherein the carrier structure has a honeycomb-like structure.

6. The method according to claim 1, wherein said drying is carried out in an air atmosphere.

7. The method according to claim 1, wherein said drying is carried out by blowing heated air at 40 to 150° C.

8. The method according to claim 1, wherein the aqueous ammonium metatungstate solution has a concentration of 2.7 to 3.49 mol/L in terms of moles of tungsten.

9. The method according to claim 1, wherein the aqueous ammonium metatungstate solution has a concentration of 3.10 to 3.88 mol/L in terms of moles of tungsten.

10. The method according to claim 1, wherein said drying is carried out in an air atmosphere at 170° C.

11. The method according to claim 1, wherein said drying is carried out in an air atmosphere at 220° C.

12. A catalyst produced by the method according to claim 1.

* * * * *